US009720850B2

(12) United States Patent
Palfer-Sollier et al.

(10) Patent No.: US 9,720,850 B2
(45) Date of Patent: Aug. 1, 2017

(54) SPECULATIVE QUERYING THE MAIN MEMORY OF A MULTIPROCESSOR SYSTEM

(71) Applicant: BULL SAS, Les Clayes-sous-Bois (FR)

(72) Inventors: Thibaut Palfer-Sollier, Montrouge (FR); Ghassan Chehaibar, Guyancourt (FR)

(73) Assignee: BULL SAS, Les Clayes Sous Bois (FR)

( * ) Notice: Subject to any disclaimer, the term of this patent is extended or adjusted under 35 U.S.C. 154(b) by 0 days.

(21) Appl. No.: 14/721,282

(22) Filed: May 26, 2015

(65) Prior Publication Data

US 2015/0347322 A1 Dec. 3, 2015

(30) Foreign Application Priority Data

May 27, 2014 (FR) ...................................... 1454792

(51) Int. Cl.
*G06F 12/08* (2016.01)
*G06F 12/14* (2006.01)
(Continued)

(52) U.S. Cl.
CPC ...... *G06F 12/1433* (2013.01); *G06F 12/0806* (2013.01); *G06F 12/0815* (2013.01);
(Continued)

(58) Field of Classification Search
CPC ............. G06F 12/0815; G06F 12/0817; G06F 12/0831; G06F 12/0806; G06F 12/1433; G06F 2212/62; G06F 2212/1052
See application file for complete search history.

(56) References Cited

U.S. PATENT DOCUMENTS 5,793,986 A    8/1998  Allen et al.
5,813,030 A * 9/1998  Tubbs ................. G06F 12/0884
                                          711/118

(Continued)

FOREIGN PATENT DOCUMENTS

EP        1 624 377 A2    2/2006
EP        1 628 209 A1    2/2006
WO      WO 00/36514     6/2000

OTHER PUBLICATIONS

Preliminary Search Report as issued in French Patent Application No. 1454792, dated Oct. 10, 2014.

*Primary Examiner* — Hiep Nguyen
(74) *Attorney, Agent, or Firm* — Pillsbury Winthrop Shaw Pittman LLP

(57) ABSTRACT

A method of accessing data in a multiprocessor system, wherein the system includes a plurality of processors, with each processor being associated with a respective cache memory, a cache memory management module, a main memory and a main memory management module, the method including: receiving by the cache memory management module an initial request for access to data by a processor; first transmitting by the cache memory management module a first request with respect to the data to at least one cache memory; second transmitting in parallel to the first transmitting by the cache memory management module, a second request with respect to the data to the main memory management module; checking by the main memory management module, whether to initiate querying of the main memory or not, and querying or not by the main memory management module, of the main memory in accordance with the said checking.

20 Claims, 2 Drawing Sheets

(51) Int. Cl.
*G06F 12/0806* (2016.01)
*G06F 12/0815* (2016.01)
*G06F 12/0817* (2016.01)
*G06F 12/0831* (2016.01)

(52) U.S. Cl.
CPC ...... *G06F 12/0817* (2013.01); *G06F 12/0831* (2013.01); *G06F 2212/1052* (2013.01); *G06F 2212/62* (2013.01)

(56) References Cited

U.S. PATENT DOCUMENTS

| | | | |
|---|---|---|---|
| 6,338,122 B1 * | 1/2002 | Baumgartner | G06F 12/0815 711/100 |
| 6,993,633 B1 * | 1/2006 | Sakakibara | G06F 12/0862 711/119 |
| 2002/0087811 A1 | 7/2002 | Khare et al. | |
| 2002/0199062 A1 | 12/2002 | Bormann | |
| 2004/0003184 A1 * | 1/2004 | Safranek | G06F 12/082 711/146 |
| 2006/0031641 A1 * | 2/2006 | Hataida | G06F 12/0833 711/144 |
| 2006/0143403 A1 * | 6/2006 | Barrett | G06F 12/0817 711/141 |
| 2009/0150622 A1 * | 6/2009 | Allen, Jr. | G06F 12/0806 711/154 |
| 2009/0327612 A1 * | 12/2009 | Nicholas | G06F 12/0831 711/141 |
| 2013/0046934 A1 * | 2/2013 | Nychka | G06F 12/0897 711/119 |
| 2014/0089592 A1 * | 3/2014 | Biswas | G06F 12/0862 711/133 |

* cited by examiner

SPECULATIVE QUERYING THE MAIN MEMORY OF A MULTIPROCESSOR SYSTEM

CROSS-REFERENCE TO RELATED APPLICATIONS

This application claims priority to French Application No. 1454792, filed May 27, 2014, the content of which is incorporated herein by reference in its entirety.

FIELD

The present invention relates to the management of the cache memory in multiprocessor computer systems.

BACKGROUND

In such systems, each processor has its own cache memory to store computation data, such as memory addresses pointing towards instructions to be executed. Processors operating in parallel share some of these data. Thus, multiple processors may access the same read or write data and possibly modify them, as well as executing a computer program.

"Cache coherence" algorithms are implemented to ensure updating of the data used by the processors, and to prevent two processors processing two different versions of the same data. The MESI algorithm is an example of such an algorithm.

The implementation of cache coherence algorithms requires a great deal of communication between processors to enable them to know the location of data at any instant. This involves determining the identification of the cache memory in which the data are located, as well as their status.

The status of data in a cache memory depends on the protocol used. In the example of the MESI protocol given above, data have a "modified" status (M for "modified") if the data are only present in one cache and these data have been changed compared to the data present in a non-cached memory (from which the initial data come). In this case, the processor that wants to have access to the data must wait until they are brought into conformity with the version in the memory. Staying with the same example, data have an "exclusive" status (E for "exclusive"), if the data are present in only one cache memory and these data in fact correspond to the non-cache memory version. Data have the "shared" status (S for "shared") if the data are present in multiple cache memories. Finally, data have the "invalid" status (I for "invalid") if the data are out of date. They must then be ignored by the processors and not used.

Other protocols exist with more or fewer defined statuses. For example the MSI protocol only has three statuses M, S and I as defined above, while the MOESI protocol adds an "owned" status (O for "owned") meaning that the data are the latest version, but that the non-cache memory from which it came is out of date.

Most cache coherence protocols implement lists, or directories, reflecting the history of requests made for each data. This type of protocol is referred to as "directory-based".

Each processor maintains a list for each line of cache memory to indicate the processors in which the data registered therein are stored as well as their status. This list may be more or less complete as regards the information it contains.

The use of this list enables one to retain a history of requests from the processors with respect to data in the processors. In particular, this enables one to filter the queries of the cache, while avoiding, for example, querying the cache of a processor that has not handled the data. Also, if particular data do not appear in the lists of the processors, it may be inferred that the data are not in use by a processor and that they are therefore stored in the main memory (not cached) and are up to date.

FIG. 1 shows a multiprocessor system schematically.

The system comprises four modules 100, 110, 120, 130. Each module comprises a plurality of processors. Module 100 comprises two processors 101 and 102. Module 110 comprises two processors 111 and 112. Module 120 comprises two processors 121 and 122. Module 130 comprises two processors 131 and 132. Each processor has a respective cache memory. These cache memories are not represented.

The number of modules in the system and the number of processors in the modules is merely illustrative. Modules may contain different numbers of processors.

In order to manage the communications between the processors, in particular to manage cache coherence, each module 100, 110, 120, 130 has a proxy module 103, 113, 123, 133 respectively. For the sake of clarity, the interconnections between the proxy modules are not represented.

Thus, each processor has a single interface to communicate with other processors. It is as if each processor is addressed each time by only one other processor. In particular, the proxy modules hold directories on behalf of their respective processor modules.

The use of proxy modules is desired when the number of processors in the system is large.

Furthermore, the system comprises a main memory module 140. This module stores the data in a sustainable manner. It is from this memory that come the data manipulated by the processors and temporarily stored in the cache memories. Module 140 also maintains a directory listing the data and the processors that have requested access to them. For the sake of clarity in the figure, module 140 is shown separately from the modules 100, 110, 120 and 130. However, the main memory of module 140 may be distributed in the modules 100, 110, 120 and 130. Each of these modules thus houses a portion of the main memory. Module 140 is thus a common virtual memory space that is physically distributed in the system.

The performance of multiprocessor systems depends in part on the ability of proxy modules to quickly find a data in a cache memory or main memory in the system.

SUMMARY

There is still a need to reduce data search time in multiprocessor systems.

An aspect of the present invention falls within this framework.

A first aspect of the invention provides a method for accessing data in a multiprocessor system, wherein the system comprises a plurality of processors, and each processor is associated with a respective cache memory, a cache memory management module, a main memory and a main memory management module, the process comprising:

reception, by the cache memory management module, of an initial request related to access to data by a processor, first transmission, by the cache memory management module, of at least a first request to at least one cache memory concerning the data, second transmission, in parallel to the first transmission, by the cache memory management module, of at least a second request to the main memory management module for the data, checking, by the main memory management module, whether to initiate or not interrogation of the main memory, and querying or not, by the main memory management module, of the main memory in accordance with the checking.

A method according to the first aspect allows querying in parallel in order to obtain the data either in the cache memory or the main memory.

This thus speeds up the obtaining of the data because one does not wait to learn that the data are not present in the cache memory in order to query the main memory.

In addition, a method according to the first aspect enables simplification of the memory querying protocols in multiprocessor systems because the speculative reading of the main memory receives a response. It is not necessary to confirm a lack of response to a request by another request.

The method may also comprise a rejection of the second request by the main memory management module in the event of unavailability of the data within the main memory.

For example, the second request is rejected by the main memory management module if it is determined that the data are available in at least one cache memory of the system.

In another example, the cache memory management module is further put in waiting mode to obtain the data from the at least one cache memory, in response to the first request.

According to an embodiment, the second request is rejected by the main memory management module, if a conflict of access to the data by multiple processors is detected.

For example, cache memory management by directory may be implemented in the system, whereby the verification includes consultation of a directory of the status of the data in the cache memory.

The method may further comprise a reception step by the main memory management module of a confirmation of the second request from the cache memory management module.

The method may further comprise an initiation step of querying of the main memory module in response to the confirmation.

The method may also comprise a transmission step to the cache memory management module of a message terminating the initial request in response to the confirmation.

A second aspect of the invention relates to a multiprocessor system configured to implement a method according to the first aspect.

The purposes of the second aspect of the invention provide at least the same benefits as those offered by the purpose of the first aspect in its various embodiments.

BRIEF DESCRIPTION OF THE DRAWINGS

Other characteristics and benefits of the invention will appear on reading the following detailed description, by means of a non-limiting example and the appended figures in which.

DETAILED DESCRIPTION

Various embodiments of the invention are described below. In particular, a specific exchange of messages allowing the cache memory management modules of processor modules (e.g. proxy modules) to quickly find the location of data in the memories of a multiprocessor system (cache memory or main memory) is described.

Figure 1:
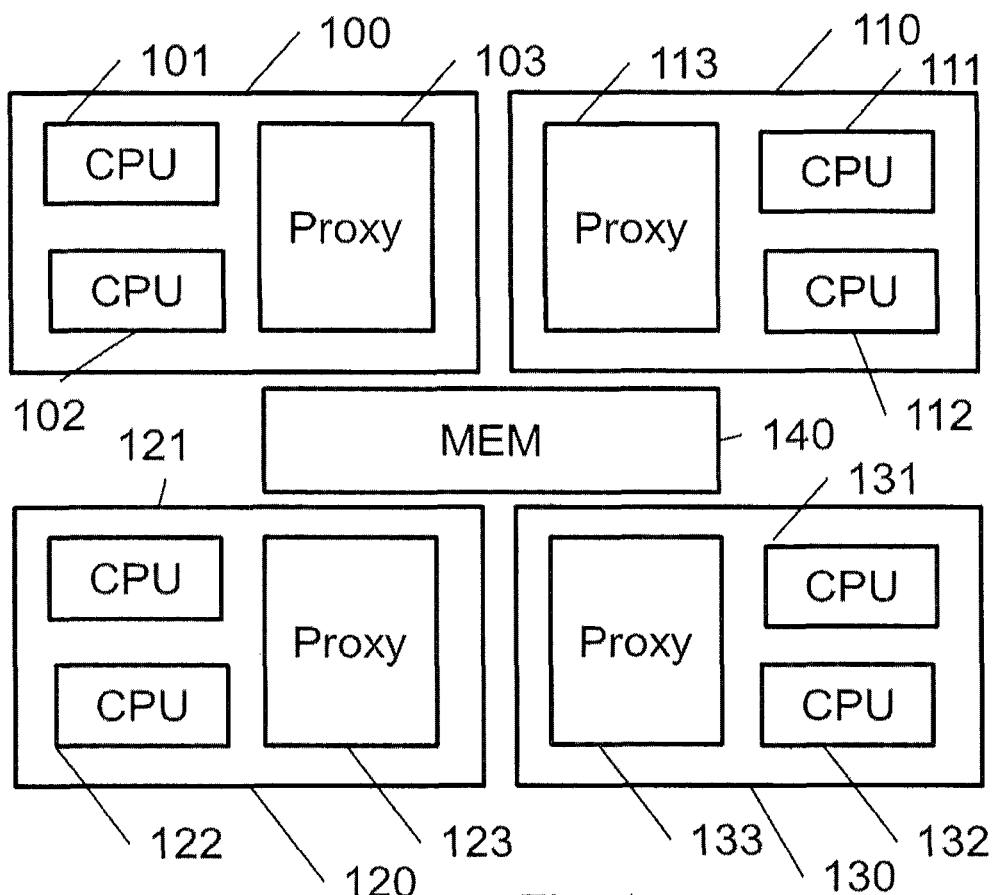
FIG. 1 shows a multiprocessor system schematically.
Figure 2:
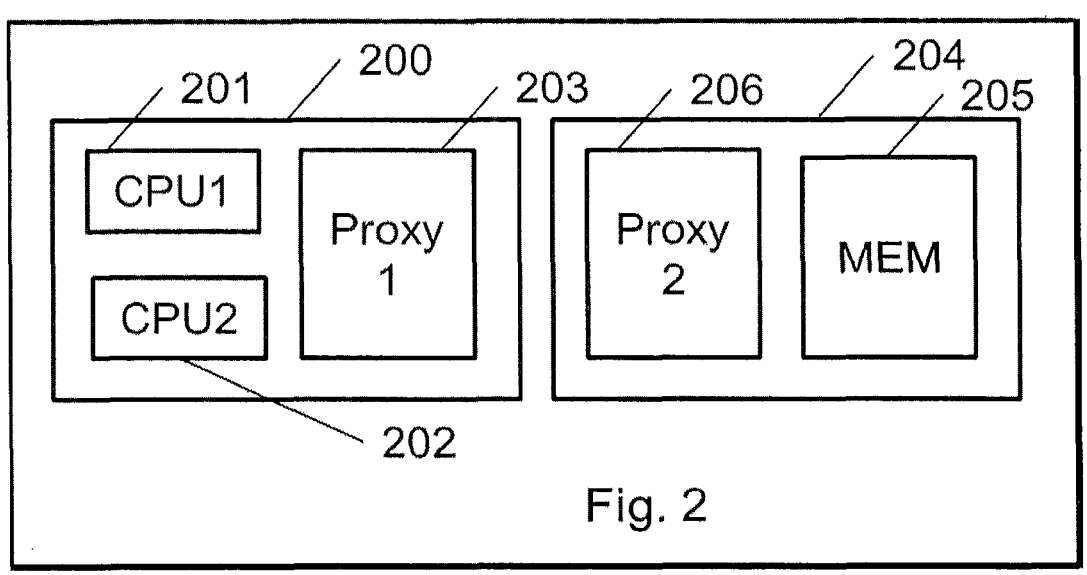
FIG. 2 shows a system according to an embodiment.

FIG. 2 shows a general context for the implementation of various embodiments in a multiprocessor system.

A processor module 200 comprises a plurality of physical processors 201, 202. In this case, the processor module has two processors, but may comprise any other number. Each processor is associated with a cache memory (not shown). A memory can be broadly termed hereinafter a "machine storage medium." Module 200 also includes a cache memory management module 203 to manage the cache memories, especially the coherence of their contents. Module 203, for example, implements the cache coherence management.

For the sake of brevity, the multiprocessor system here comprises a single processor module. It will be appreciated that it could comprise a completely different number.

The system also comprises a main memory module (not cache) 204. The module includes a main memory 205 to store data and a main memory management module 206. For the sake of clarity of the figure, module 204 is shown separately from the processor module 200. However, the main memory module may be distributed in the processor modules. Each of these modules thus houses a portion of the main memory. Module 204 is thus a common virtual memory space physically distributed in the system. When the cache memory management module 203 wishes to obtain certain data, following an initial request from the processor 201 (or another processor module 200), it sends a request with respect to these data to the main memory management module 206. The initial request is, for example, subsequent to the transmission by the processor to its cache memory of a reference to a memory address. When this querying is not satisfied, i.e. the memory block corresponding to the memory address is not in the cache (this is known as a "MISS" as opposed to a "HIT" when the block is present), the processor transmits the initial request to obtain the memory block in the main memory. The querying of the processor may concern the reading of data with or without the intention to modify them.

Module 203 sends this request although it has not yet checked whether the data in question are or are not in a cache memory of the processor module 200 to which they belong, or are in or not in a cache memory of another processor module. The request from module 203 to module 206 is thus described as "speculative". It could also be called "request in advance".

In order that module 206 may identify the speculative nature of the request, a special code may be defined and associated with the request. Thus, module 206 may implement the processing associated with the speculative requests as described below.

For example, module 206 has a directory for all data stored in module 205 that provides it with information on the status of the data (for example, within the meaning of the MESI protocol mentioned above) and on the list of protocol agents, especially the processors, which own a copy in their respective cache memories. The information may be more or less detailed depending on the memory management protocol implemented. The protocol agents cover the processors, the proxies and any other entity in a position to send requests for access to data in the main memory. In the hierarchy of protocol agents, the processors are the terminal agents that are the sources of requests (for it is they that use data), while the proxies are intermediate agents because they represent the processors in the main memory.

When module 206 receives a speculative request, it consults its directory to check the status of the data in the cache memories in the system.

If the directory information allows determination that the data are not present in the cache memory, or with a status compatible with its request (e.g. in the sense of the MESI protocol), module 206 processes the speculative request in a standard manner, i.e. as if there was not a speculative request. A standard request is a request that module 203 would have sent only after consulting its cache memory, i.e. knowing that the data are not present in the cache memory. The request received by module 206 then follows the standard processing provided in the cache memory coherence protocol.

If the directory information allows determination that the data are present in the cache memory, and with a status compatible with the request, module 206 does not begin the processing of the speculative request.

If module 206 detects a conflict with another current request with respect to the data that are the subject of a speculative request, it may not respond to this request, whatever the information provided by the directory. A conflict occurs when two protocol agents (processor, proxy) transmit respective requests to the same memory address. For example, if two processors wish to modify the same data, they should do it successively in order to avoid any lack of coherence of the data.

In all cases, module 206 sends a message to module 203 to inform it that the speculative request has been processed.

This message may include an indication of the outcome of the speculative request by module 206 (standard processing or end of processing). This indication may condition subsequent processing performed by module 203. In parallel to the sending of the speculative request, module 203 launches consultation of the cache memories of the system in a standard manner. Once the consultation is over, module 203 waits for the response from module 206 indicating the end of the processing of its speculative request. The consultation normally takes less time than querying module 206. However, if the reverse occurs and module 203 receives the response from module 206 before the end of the consultation, it waits until the end of the latter. As long as these two conditions are not met (end of consultation and reception of a response from module 206), module 203 does not continue processing the request initially received from processor 201. In addition, it will not launch processing of other requests concerning the same data, which could be from the same processor 201 or from another processor of the processor module.

The result of the consultation of the cache memories enables module 206 to determine the subsequent processing to be performed.

If the data are present in cache memory, with a status compatible with the initial request, module 203 provides no response to its speculative request. Module 206, also having had this information through its directory, does not take any action on the speculative request. The speculative request is thus completely terminated over the entire system.

If the data are not present in the cache memory, or have a status that is not compatible with the initial request, the response from module 206 may include an indication to determine the subsequent processing. For example, module 206 indicates in its response what action it has taken with respect to the speculative request. For example, its response includes an indication of the provision or not of the data, of a potential conflict to be dealt with, or the like. If module 206 continues processing of the speculative request, module 203 has to wait for the data. If module 206 has not continued processing of the request, module 203 sends it a confirmation of processing in order to obtain the data. This confirmation of processing, for example, contains information necessary for module 206 to process the speculative request in case it has not retained the information initially contained in the speculative request. This is thus a reiteration of the speculative request. The information contained in the confirmation of processing may, for example, include the identity of the entity requesting the data, a request number, a number of the address requested, or other information.

As another example, module 206 does not indicate in its response what action it has taken with respect to the speculative request. Module 203 then sends a confirmation of processing of the speculative request to module 206. This confirmation of processing may contain the information necessary for module 206 to process the request in case the latter ended the processing of the speculative request without taking any action and did not retain the associated information. If module 206 continues processing of the speculative request, in any event it still awaits a confirmation from module 203 and does not end the processing of the speculative request until it has received this confirmation.

As of that moment in all the cases described above, the speculative request is subject to the standard processing provided by the cache coherence protocol implemented by the cache memory management modules.

Figure 3:
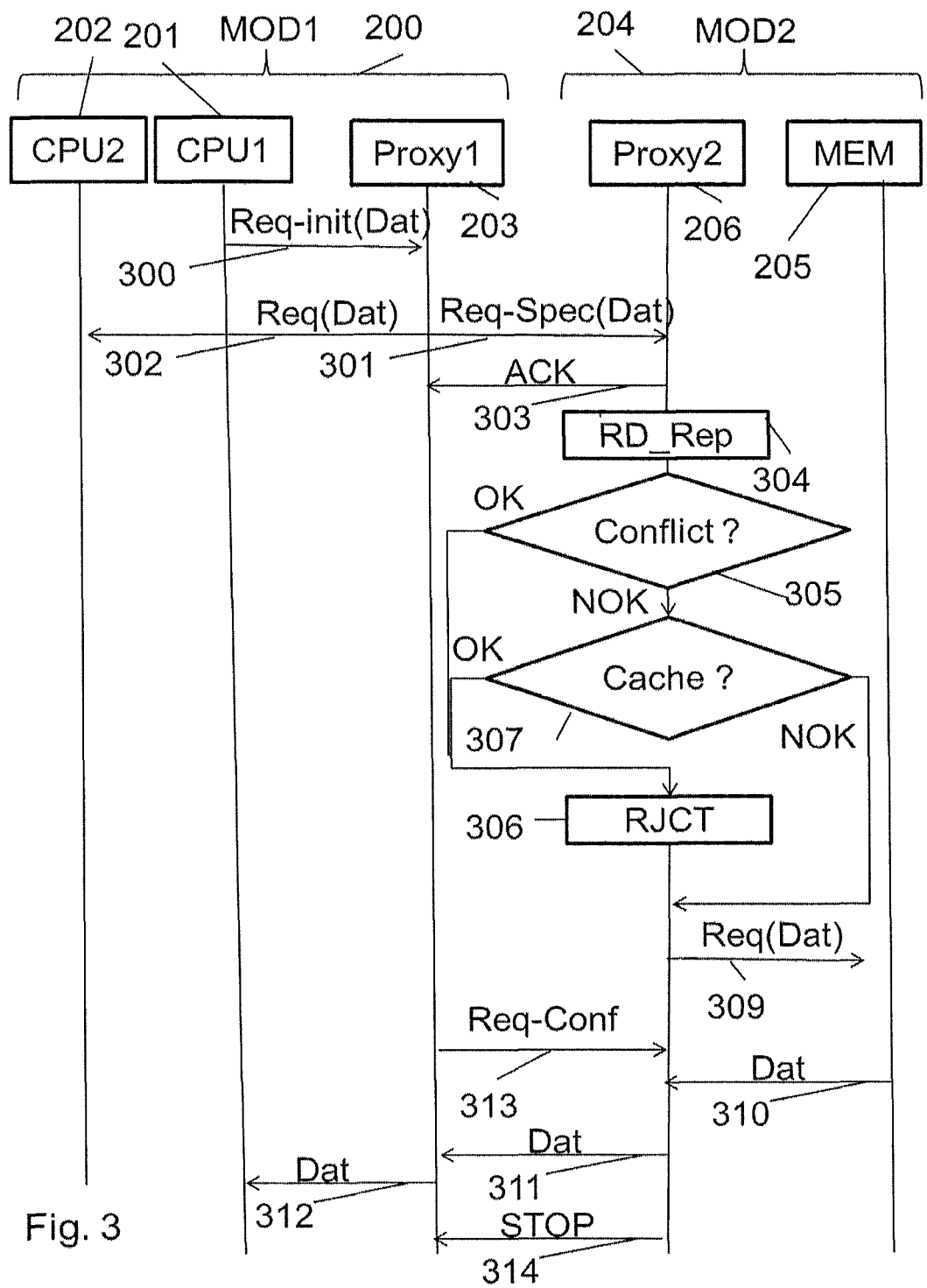
FIG. 3 is a diagram illustrating the interaction between the various elements of the system.

FIG. 3 is a diagram illustrating the exchanges between the various system components described above.

In FIG. 3, it is shown processor module 200 with processors 201, 202 and the cache memory management module 203, as well as the main memory module 204 comprising the main memory management module 206 and the main memory 205. As in the case of FIG. 2, the cache memories respectively associated with the processors are not shown.

During a first step 300, module 203 receives an initial request concerning data from the processor 201. When module 203 receives this request, it launches a parallel speculative querying 301 of module 206 and consultation 302 of the cache memory of processor 202. The cache memory of processor 201 is not consulted because this processor did so before sending the initial request.

Consultation of the processors may, for example, be through "snoopy" type transactions. The consultation could also be done by querying a directory if module 203 implements a cache memory coherence management by directory.

The speculative request may itself be, for example, a copy of the initial request sent by processor 201. The speculative nature of the request sent in step 301 may also be identified by a class of messages, i.e. a set of messages of the same type, which may, for example, be added to the types of transactions managed by the memory management modules. For example, this message class is identified by a unique number and adopts the characteristics of the request of the "request" message class used by the processors (e.g. data read requests). This class of messages that is unique to speculative requests is conveyed, for example, within the same virtual queue and obeys the same protocol rules as those of standard requests (i.e. non-speculative), The requests and their responses pass through the processor module on virtual channels (a physical link may support multiple virtual channels). Thus, speculative requests and standard requests follow the same virtual channel.

When module 206 receives the speculative request, it sends a message 303 as a receipt to confirm that it has been taken into account.

Once it has submitted its requests in steps 301 and 302, module 203 waits for responses from module 206 or processor 202.

Thus, module 203 queries the cache memory of processor 202 of the processor module 200, while module 206 also consults its directory in step 304 to determine the location of the required data and possibly their status.

The speculative querying allows the cache memory management modules receiving requests from the processor not to query the directory, while maintaining an equivalent level of performance in case these modules perform such queries before querying the main memory, The sending of the speculative request in step 301 in parallel to the sending in step 302 saves time and accelerates system operation.

When module 206 receives the speculative request, it first stores it in a sub-module allowing processing of the requests. Module 206 then consults the directory containing the status of the data and the list of processors in which they are stored (remember that the data in question may be in different cache memories).

A check is then performed during step 305 to detect any conflict between the processors with respect to the data. If a conflict is detected (OK), the speculative request is rejected in step 306.

Otherwise (NOK), step 307 is implemented to check whether the data are cached.

If the directory indicates that the data are cached (OK), the speculative request is rejected in step 306.

During rejection step 306, the sub-module in which the speculative request is stored is reset to zero, as would be the case with a standard request.

If the directory of module 206 indicates that the data are available in cache memory, it lets module 200 obtain the data internally. Module 203 receives a response from the processor with the data (processor 202 in this case) indicating that it will transmit the data, and then module 203 receives the data (steps not shown).

If no conflict is detected and the data are not found in module 200, the proxy module 206 then immediately and without waiting sends a read request for the data in question to the memory 205 in step 309.

The memory then responds with the data in step 310 and the proxy module 206 transmits them to the proxy module 203 in step 311, so that it can transmit them to processor 300 in step 312.

In parallel, following reception of the message 303 with respect to taking into account the speculative request, module 203 sends a message 313 confirming the speculative request in order to obtain the data.

In practice, this involves a normal read request. The interpretation of the request by module 206 is based on the rejection or not of the speculative request. If the request was not rejected, the confirmation message for the speculative request may arrive at any time. It may happen, for example, that the confirmation message is received before the data are received from the memory.

Furthermore, the data received by module 206 from the memory are transmitted to module 203 without waiting for the request confirmation message. This optimizes the latency between the initial request and the reception of the data.

When module 206 has received the confirmation message and has transmitted the data, it sends termination message 314 to module 203.

In fact, a read request is a transaction that triggers several types of messages (requests and responses): response with data, response without data (cache consultation responses, for example). Several responses may be aggregated into a single message, but they are in fact distinct in their content.

It is the response that contains the data requested that releases the processor that is waiting for it.

In addition, if a transaction is identified by a number in the system, it is therefore desirable to know that all processing related to this transaction is completed in order to re-use that number. The termination message thus allows the number to be freed. When module 206 has terminated all internal processing of a transaction (for example, updating its directory following the transaction), it sends the message to termination module 203.

In the case (not shown) where the speculative request is dismissed, module 206 transmits the request 309 on condition that it receives the confirmation request. Module 206 interprets the confirmation request as a normal request and queries memory 205 (in the previous case where the speculative request was rejected, the confirmation request was interpreted as a confirmation for the termination of the process).

It may happen that the information in the directory of module 206 may not be accurate. Thus, it may wrongly reject the speculative request during step 306. In this case, the confirmation request 313 will also trigger the sending of the request 309.

Speculative requests are always followed by responses. Thus they cannot persist in the system without its issuers knowing whether they have been processed or not. This optimizes system operation.

The embodiments described above may be the subject of various implementations.

For example, the status of the data stored in the directory may be used. For example, when module 206 consults its directory in step 304, it may only consult the list of processors with the data having a particular status specified, for example, by the processor in the initial request in step 300. Thus even if the data are present in cache memory, but with a different status than the one requested, the request may not be processed.

For example, if the processor wishes to have the exclusivity of the data, i.e. the only one to possess them, and it has the data in its cache with shared status, these data are not useful to it. It must then obtain the data with exclusive status. Module 206 may then decide to continue the processing of the request if the status of the data in the cache is not compatible with that requested by the request.

The cache memory management modules may implement cache memory coherence management by directory but also by other types of coherence management.

Some systems may comprise a plurality of multiprocessor modules (or "clusters"). Each multiprocessor module comprises a plurality of processors respectively associated with their cache memories and hosting a portion of a main memory module (main memory and management module). In other words, the main memory module is distributed in the multiprocessor modules. In these systems, cache coherence management can be of the "snoopy" type within each multiprocessor module, where it is then managed by directory ("directory based") among the multiprocessor modules.

The embodiments and variants described above provide a simple, robust and generic solution to enhance the performance of a multiprocessor system respecting a cache coherence protocol, while enabling the reduction of costs of development and production of the proxy modules.

In particular, cache coherence is guaranteed. In fact, processing of speculative requests does not modify the cache coherence protocol. It adds a phase that precedes the standard processing of a request. This phase does not include any action that could jeopardize cache coherence, since it simply checks the cache status for the relevant data.

Furthermore, it is possible to manage data access conflicts, such as when multiple system processors simultaneously request access to the same data. With respect to the cache memory management module, conflicts may be managed by blocking the processing of speculative requests and any other request related to the same data, as long as the response of the module to which the speculative request was sent, has not been received. In the case of the main memory management module, even the slightest conflict detected may cause the end of the processing of the speculative request without further action.

Generally, access to data may be given more quickly to processors. The main memory is queried even before it knows the outcome of the consultation of the consultation of the cache in order to send the request to the main memory.

The resources used for the implementation of embodiments are reduced. Each resource costs not only silicon surface but also energy consumption, production yield or checking time. There is, therefore, a very real interest in minimizing the resources used to operate a system.

Speculative reading allows this problem to be completely overcome because it is not necessary to implement either a directory or a cache in the proxy module. The absence of a directory can be offset by the reduced access time to the main memory. The proxy module relies on the directory of the main memory management module. Speculative reading thus allows a proxy module to offer equivalent performance to that provided by the presence of a directory or a cache without having to implement them.

It will be appreciated by one skilled in the art that the disclosed arrangements and methods described herein represent a solution to the technological problem currently faced by designers to reduce data search time in multiprocessor systems.

Having described and illustrated the principles of the invention with reference to various embodiments, it will be recognized that the various embodiments can be modified in arrangement and detail without departing from such principles. It should be understood that the devices, modules, processors, processing units, programs, processes, or methods described herein described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

Execution of the sequences of machine instructions contained in a memory causes the processor or processing unit to perform at least some of the process steps or function(s) of the procedures described herein. One or more physical processors or physical processing units in a multi-processing arrangement may also be employed to execute the sequences of instructions contained in the memory or machine/computer readable medium. In alternative embodiments, hardwired circuitry may be used in place of or in combination with software instructions.

The term "computer readable medium" or "machine readable medium" or "machine storage medium" as used herein refers to any medium that participates in providing instructions to a processor or processing unit for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer/machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer/machine readable media may be involved in carrying one or more sequences of one or more instructions to processor for execution.

Computer programs comprising machine executable instructions for implementing at least one of the steps of the method described herein or function(s) of various elements of the structural arrangement can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

The present invention has been described and illustrated in this detailed description with reference to the accompanying figures. However, the present invention is not limited to the embodiments presented. Other variants and embodiments may be derived and implemented by a person skilled in the art on reading the present description and the appended figures.

In the claims, the term "comprise" does not exclude other elements or other steps. The indefinite article "a" does not exclude the plural. A single processor or several other modules may be used to implement the invention. The various features presented and/or claimed may be beneficially combined. Their presence in the description or in different dependent claims does not exclude the possibility of combining them. The reference signs should not be construed as limiting the scope of the invention.

What is claimed:

1. A method of accessing data in a multiprocessor system, wherein the multiprocessor system comprises a plurality of processors, with each processor being associated with a respective cache memory, a cache memory management module, a main memory and a main memory management module, the method comprising:

receiving, by the cache memory management module, an initial request for access to data by a processor;

first transmitting, by the cache memory management module, at least a first request with respect to the data to at least one cache memory;

second transmitting in parallel to the first transmitting, by the cache memory management module, at least a second request with respect to the data to the main memory management module;

after the second transmitting in parallel, checking, by the main memory management module, whether to initiate querying of the main memory or not; and querying or not, by the main memory management module, of the main memory in accordance with the checking.

2. The method according to claim 1, further comprising rejecting by the main memory management module, the second request in the event of unavailability of the data within the main memory.

3. The method according to claim 1, wherein the second request is rejected by the main memory management module, if it is determined that the data are available in at least one cache memory of the system.

4. The method according to claim 3, wherein the cache memory management module further waits to obtain the data from the at least one cache memory, in response to the first request.

5. The method according to claim 2, wherein the second request is rejected by the main memory management module, if a conflict of access to the data by a plurality of processors is detected.

6. The method according to claim 1, wherein cache memory management by directory is implemented in the system and wherein the checking comprises consulting a directory of the status of data in cache memory.

7. The method according to claim 1, further comprising receiving by the main memory management module of a confirmation of the second request from the cache memory management module.

8. The method according to claim 7, further comprising initiating querying of the main memory module in response to the confirmation.

9. The method according to claim 7, further comprising transmitting to the cache memory management module a termination message for the initial request in response to the confirmation.

10. A multiprocessor system comprising:
a plurality of processors, each processor being associated with a respective cache memory;
a cache memory management module;
a main memory, and
a main memory management module,
wherein for access to data in the system:
the cache memory management module is configured to receive an initial request related to access by a processor to data, to first transmit at least a first request to at least one cache memory for the data and to second transmit, in parallel with the first transmission, at least a second request to the main memory management module for the data, and
the main memory management module is configured to conduct a check, after the first and second transmissions, which triggers or not the querying of the main memory and to query or not the main memory in accordance with the check.

11. The method according to claim 1, wherein the cache memory management module is separate from and different than the main memory management module.

12. A method of accessing data in a multiprocessor system, wherein the multiprocessor system comprises a plurality of processors, with each processor being associated with a respective cache memory, a cache memory management module, a main memory and a main memory management module, the method comprising:
receiving, by the cache memory management module, an initial request for access to data by a processor;
first transmitting, by the cache memory management module, at least a first request with respect to the data to at least one cache memory;
second transmitting in parallel to the first transmitting, by the cache memory management module, at least a second request with respect to the data to the main memory management module;
checking, by the main memory management module, whether to initiate querying of the main memory or not;
rejecting the second request, by the main memory management module, in accordance with the checking; and
after rejecting the second request, querying, by the main memory management module, of the main memory responsive to the cache memory management module confirming the second request.

13. The method according to claim 12, wherein the second request is rejected responsive to an unavailability event of the data within the main memory.

14. The method according to claim 12, wherein the second request is rejected, by the main memory management module, responsive to the checking detecting a conflict with respect to the data between at least two processors of the plurality of processors or to the checking determining that the data is available in at least one of the cache memories.

15. The method according to claim 14, wherein the cache memory management module further waits to obtain the data from the at least one cache memory, in response to the first request.

16. The method according to claim 12, wherein the second request is rejected by the main memory management module, if a conflict of access to the data by a plurality of processors is detected.

17. The method according to claim 12, wherein cache memory management by directory is implemented in the system and wherein the checking comprises consulting a directory of the status of data in cache memory.

18. The method according to claim 12, further comprising transmitting to the cache memory management module a termination message for the initial request in response to the confirmation.

19. The method according to claim 12, wherein the confirmation of the second request contains information including an identity of the processor requesting the data, a request number, or a number of an address of the data.

20. A multiprocessor system comprising:
a plurality of processors, each procssor being associated with a respective cache memory;
a cache memory management module;
a main memory; and
a main memory management module;
wherein for access to data in the system:
the cache memory management module is configured to receive an initial request related to access by a processor to data, to first transmit at least a first request to at least one cache memory for the data and to second transmit, in parallel with the first transmission, at least a second request to the main memory management module for the data; and the main memory management module is configured to: (i) conduct a check responsive to the second request with regard to a query of the main memory; (ii) reject the second request in accordance with the conducted check; and (iii) query the main memory responsive to the cache memory management module confirming the second request notwithstanding a rejection of the second request.

\* \* \* \* \*